(12) United States Patent
Tunning et al.

(10) Patent No.: US 8,006,180 B2
(45) Date of Patent: Aug. 23, 2011

(54) SPELL CHECKING IN NETWORK BROWSER BASED APPLICATIONS

(75) Inventors: Brian R. Tunning, San Francisco, CA (US); Omar H. Shahine, San Francisco, CA (US); Walter Hsueh, San Mateo, CA (US); Imran I. Qureshi, Milpitas, CA (US)

(73) Assignee: Mircrosoft Corporation, Redmond, WA (US)

( * ) Notice: Subject to any disclaimer, the term of this patent is extended or adjusted under 35 U.S.C. 154(b) by 1212 days.

(21) Appl. No.: 11/328,781

(22) Filed: Jan. 10, 2006

(65) Prior Publication Data
US 2007/0162847 A1 Jul. 12, 2007

(51) Int. Cl.
*G06F 17/21* (2006.01)
(52) U.S. Cl. ........................................ 715/257
(58) Field of Classification Search .................. 715/533, 715/256, 257, 258
See application file for complete search history.

(56) References Cited

U.S. PATENT DOCUMENTS

| | | | | |
|---|---|---|---|---|
| 5,857,198 A * | 1/1999 | Schmidt | ..................... | 707/103 R |
| 6,085,206 A * | 7/2000 | Domini et al. | ................ | 715/257 |
| 6,131,102 A * | 10/2000 | Potter | ........................... | 715/257 |
| 6,326,953 B1 * | 12/2001 | Wana | ............................. | 345/168 |
| 7,254,773 B2 * | 8/2007 | Bates et al. | ..................... | 715/256 |
| 2002/0194229 A1 * | 12/2002 | Decime et al. | ................ | 707/533 |
| 2003/0237055 A1 * | 12/2003 | Lange et al. | ................... | 715/530 |
| 2004/0093567 A1 * | 5/2004 | Schabes et al. | ............... | 715/533 |
| 2005/0149867 A1 * | 7/2005 | Freelander et al. | ........... | 715/533 |
| 2005/0223326 A1 * | 10/2005 | Chang et al. | ................... | 715/533 |
| 2005/0283726 A1 | 12/2005 | Lunati | | |
| 2005/0289463 A1 * | 12/2005 | Wu et al. | ........................ | 715/533 |
| 2006/0143564 A1 * | 6/2006 | Bates et al. | ..................... | 715/533 |

OTHER PUBLICATIONS

Conventional and Associative Memory-Based Spelling Checkers Vladimir Cherkassky, Nikolaos Vassilas and Gregory L. Brodt Dept. of EE, Univ. of Minnesota, Minneapolis, MN 55455 IEEE 1990.*
Mastering Microsoft Office 2000 Professional Edition Gini Courter Published by SYBEX, Inc., 1999.*

* cited by examiner

*Primary Examiner* — Stephen Hong
*Assistant Examiner* — Ahamed Nazar
(74) *Attorney, Agent, or Firm* — Vierra Magen Marcus & DeNiro LLP

(57) ABSTRACT

Spell checking of a document in a network browser based application is performed automatically. Spell checking may be performed in a content page in response to user editing of the document text. Text entered into a document through a browser application interface is divided into nodes. The nodes may be associated with a section, line or word of text. Each node may be assigned one or more parameters which may indicate whether the node has been spell checked or not. Selected nodes are sent to a spell check service for spell checking. Correction information is received in response to the spell check request. Once a client device receives the correction information, words within the text range of the document that match identified misspelled words are processed. In one embodiment, matching words are highlighted with a visual indicator to indicate that they may be incorrectly spelled.

18 Claims, 9 Drawing Sheets

SPELL CHECKING IN NETWORK BROWSER BASED APPLICATIONS

BACKGROUND

Spell checking is a valuable tool for preparing documents. Client-based word processing applications are common examples of applications that have a spell checking feature. These word processing applications include locally stored libraries. The local libraries are accessed by the word processing application to spell check documents created by a user.

Additionally, some web-based email applications provide spell checking of user generated content. In these web-based email applications, a user may provide input to request a spell check after generating an email. In response to receiving user input requesting the spell check, the application will send a spell check request to a server over a network. Though this provides for spell checking functionality, it requires user input which specifically requests it. The user must then wait for the response to be received and for the generated email to be updated with spelling corrections. After the email is updated, the user will usually review the email to be sure the spelling corrections made are correct. Thus, previous methods for spell checking in a web based email application interrupt the document generation process, are inconvenient and make email preparation more time consuming.

A more convenient web-based application spell checking feature would be advantageous for generating documents in web-based applications.

SUMMARY

The technology herein, roughly described, pertains to automatic spell checking of a document in a network browser based application. Spell checking may be performed in a content page while text is generated and/or edited by a user. The spell checking may be performed automatically and does not require a user to request the spell check. Rather, spell checking is performed in response to user editing of the document text.

In one embodiment, text entered into an interface by a user is divided into nodes. The nodes may be associated with a line of text, a section of text, or a particular word of text. Each node may be assigned one or more parameters. The parameters may indicate whether the node has been spell checked or not, node identification information and other data.

While a user is generating a document, selected portions of text are sent to a spell checking service to be spell checked. In one embodiment, nodes associated with text that has not been spell checked are selected and sent to a spell check server. The server spell checks the received words and sends correction information to the requesting client. In one embodiment, the correction information may include a list of incorrectly spelled words, suggested replacement words, node boundary information and document identification information. In one embodiment, inclusion of the node boundary information in the correction information is optional. The boundary information may include a start node and end node that encompass the text range which is spell checked. Once a client receives the correction information, words within the text range of the document that match identified misspelled words are processed. In one embodiment, matching words are highlighted with a visual indicator to indicate that they may be incorrectly spelled.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

A browser application provides web-based spell checking for a content page. Spell checking may be performed in a content page while text is generated and/or edited by a user. The spell checking may be performed automatically and does not require a user to request the spell check. Rather, spell checking is performed in response to user editing of the document text.

User entered text in a browser application interface is divided into nodes. The nodes may be associated with a line of text, a section of text, or a particular word of text. Each node may be configured with one or more parameters. The parameters may indicate whether the node has been spell checked or not, node identification information and other data.

Selected portions of text are sent to a spell checking service to be spell checked while a user is generating and editing the text. In one embodiment, nodes associated with text not yet spell checked are selected to be sent to a spell check server. The server spell checks the received words and sends correction information to the requesting client. The correction information may include a list of incorrectly spelled words, suggested replacement words, node boundary information, document identification information and other information. Node boundary information can include a start node and end node that encompass the text range which is spell checked. Once a client receives the correction information, words within the text range of the document that match identified misspelled words are processed. In one embodiment, matching words are associated with a visual indicator to indicate that they may be incorrectly spelled.

In one embodiment, the present technology is implemented at least in part by a network browser. The network browser may implement an edit mode which allows for a user to edit text in a content page interface. For example, a browser may allow a user to generate or reply to an email through a content page provided by a network server. The network browser may implement the editing mode with an application program interface (API). The API may allow for text editing, search and find functionality in the text and other functions. In one embodiment, the API may be a "Text Range" API implemented by the browser.

The text within the content page text to be spell checked can be organized by a browser in several ways. In one embodiment, a browser (or browser implemented API) may associate text into one or more nodes. For example, a node may be generated for each line of a text for a block of text in a document. Thus, for a document containing three lines of text, one node would be associated for each line, resulting in three nodes. Configuring nodes for a block of text is discussed in more detail below.

Figure 1:
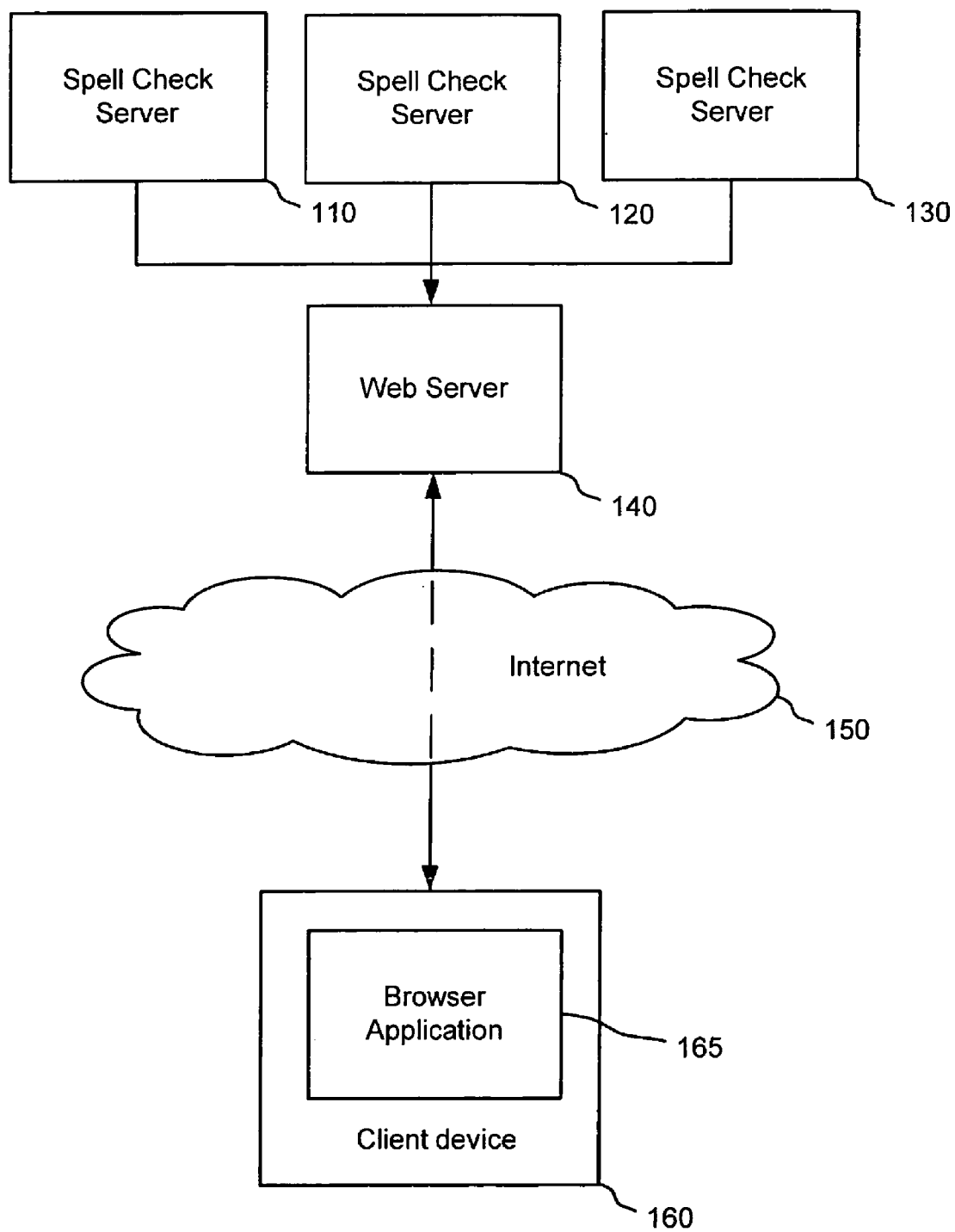
FIG. 1 illustrates a system for implementing network-based spell checking.

FIG. 1 illustrates an embodiment of a system for implementing network-based application spell checking. The system of FIG. 1 includes spell check servers 110-130, network server 140, network 150, and client device 160. In one embodiment, network 150 may be implemented as the Internet.

Network server 140 may communicate with spell check servers 110-130 and client device 160. Network server 140 may be implemented as one or more servers which provide a service over network 150. In one embodiment, network server 140 may be an email front end server. In this case, the email front end server can be implemented as one or more servers used to provide an electronic mail service by an email service provider. A user may then access an email account through network server 140 from client device 160 over network 150. Network server 140 may receive a spell check request as a content request from client device 160.

As network server 140 receives spell check requests, the requests are forwarded to any of spell check servers 110-130. Each of spell check servers 110-130 may receive a spell check request, process the spell check request, and provide a spell check response to network server 140. Network server 140 may then forward the response client device 160 which requested the spell check service. In one embodiment, network server 140 and spell check servers 110-130 may comprise a spell check service. In another embodiment, the spell check service may be implemented by spell check servers 110-130 alone.

Spell check servers 110-130 communicate with network server 140 as discussed above. Each of spell check servers 110-130 may process text to detect misspelled words. In some embodiments, the spell check servers may also detect improper grammar and other actual or suspected language mistakes in text received in a content request. Spell check servers 110-130 may perform spell checking using any of several known methods of spell checking. The actual spell check method used is not germane to the present technology.

Client device 160 communicates with network server 140 over network 150 and may include browser application 165. Browser application 165 may be a network browser application used to access content provided by network server 140. Additionally, the browser may allow a user to edit text in a content page retrieved from a network server. In this case, browser application 165 may implement an API that provides text editing features. In one embodiment, browser application 165 may be implemented as a web browser.

Figure 2:
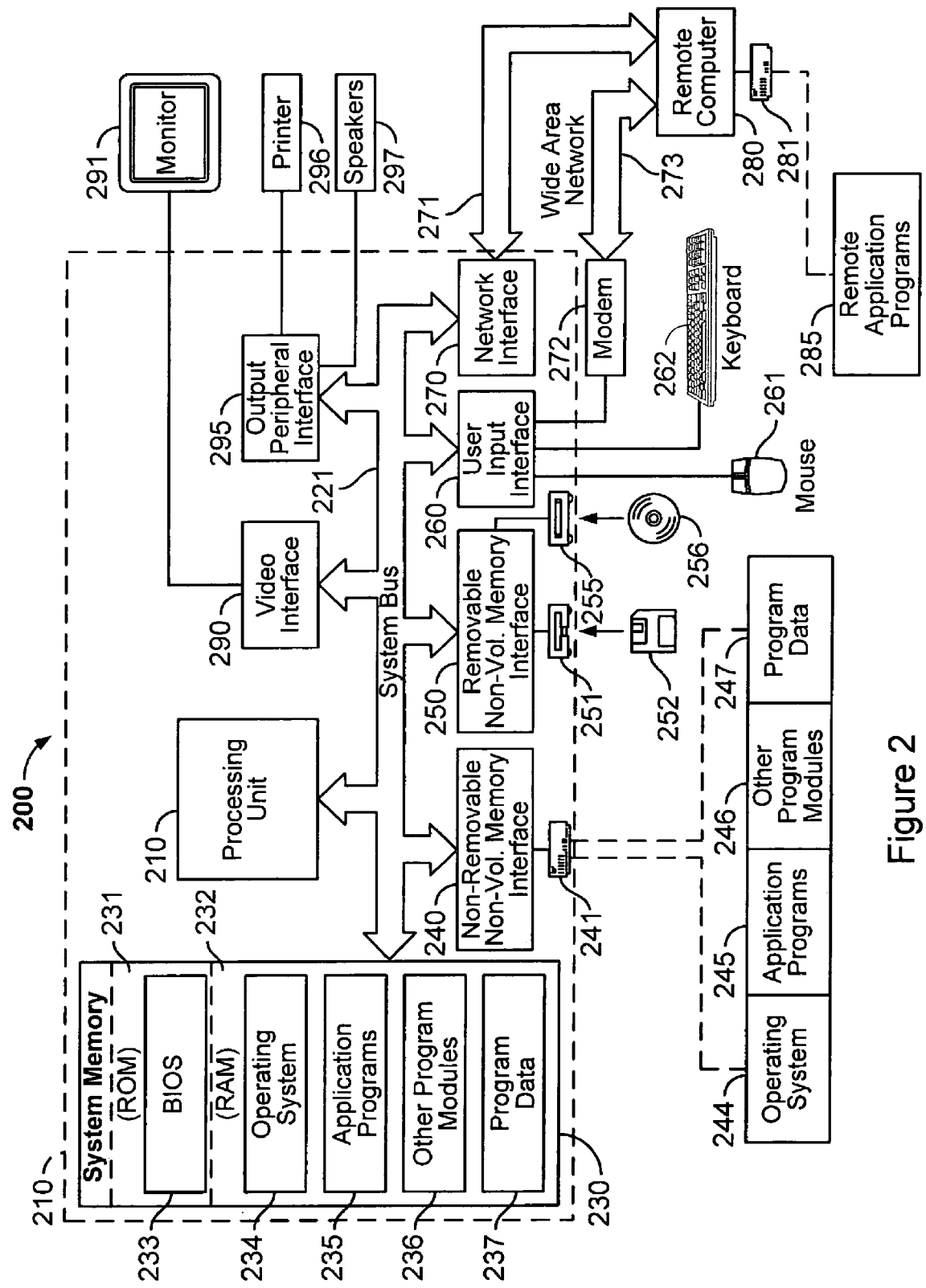
FIG. 2 illustrates an embodiment of a computing environment for use with the present technology.

FIG. 2 illustrates an example of a suitable computing system environment 200 on which the present technology may be implemented. The computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200.

In one embodiment, the computing environment of FIG. 2 may be used to implement network server 140, spell check service servers 110-130, and client device 160.

The present technology is operational with numerous other general purpose or special purpose computing system environments or configurations. Examples of well known computing systems, environments, and/or configurations that may be suitable for use with the present technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present technology may be described in the general context of computer-executable instructions, such as program modules, being executed by a computer. Generally, program modules include routines, programs, objects, components, data structures, etc. that perform particular tasks or implement particular abstract data types. The present technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the present technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or present technology for storage of information such as computer readable instructions, data structures, program modules or other data. Computer storage media includes, but is not limited to, RAM, ROM, EEPROM, flash memory or other memory present technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during startup, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
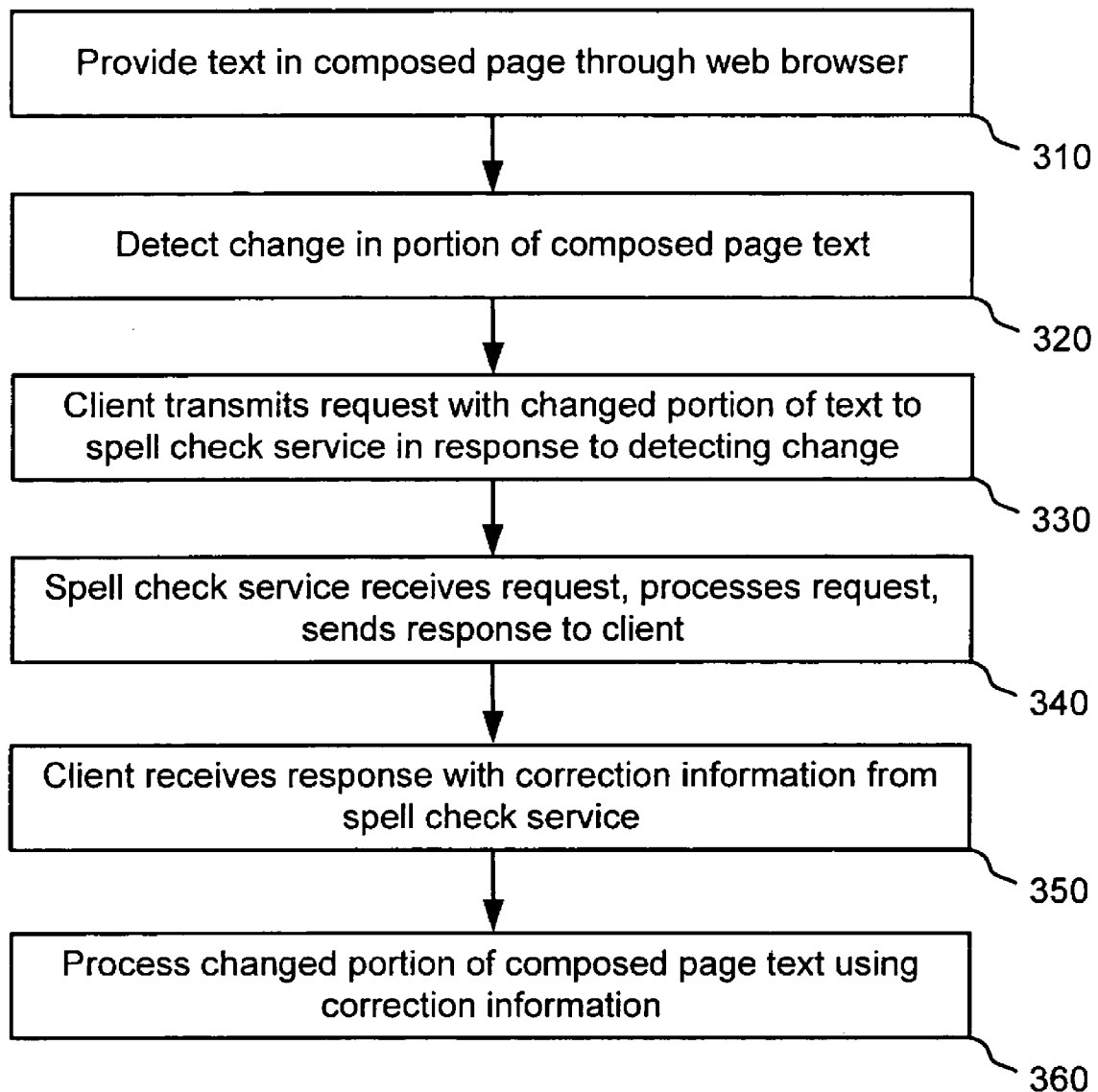
FIG. 3 illustrates a flowchart of an embodiment of a process for providing spell checking in a network-based application.

FIG. 3 is a flowchart of an embodiment of a process for providing spell checking in a network-based browser application. The flowchart of FIG. 3 begins when text is provided in a content page through a browser application 165 at step 310. In one embodiment, the text may be provided in a content page provided by an email service. In this case, the content page may be an inbox or other page provided by the email service and the text may be part of an original email or a reply to an email. Next, a change is detected in a portion of the content page text at step 320. In one embodiment, the change may be initiated by a user. For example, a user may type new text into the content page, delete text, paste text, drag and drop text, or perform some other action that changes the text in a section of the content page. Detecting a change in a portion of a content page text is discussed in more detail below with respect to the flowchart of FIG. 4. The changed portion of the text is transmitted to a spell check service at step 330 in response to detecting the change. In one embodiment, transmitting the text to a spell check service involves preparing a request and sending the request to network server 140 by client device 160. This is discussed in more detail below with respect to FIG. 6.

After the request is sent, network server 140 receives the request with the text, processes the text, and sends a response to client device 160 at step 340. In one embodiment, network server 140 forwards the request to a spell check server to perform the actual spell checking of the request content. The spell check server performs the spell check and provides correction information to network server 140 in a response. Network server 140 then sends the response to client device 160. This is discussed in more detail below with respect to the flowchart of FIG. 8. Client device 160 receives the correction information from network server 140 at step 350. After receiving the correction information, the changed portion of the content page text is processed using the correction information at step 360. Processing the changed portion of content page text involves finding words within the text identified as being misspelled and processing the words. Processing the words may include providing a visual indicator that the word has been identified as being misspelled. Processing a changed portion of content page text using correction information is discussed in more detail below with respect to the flowchart of FIG. 9.

Figure 4:
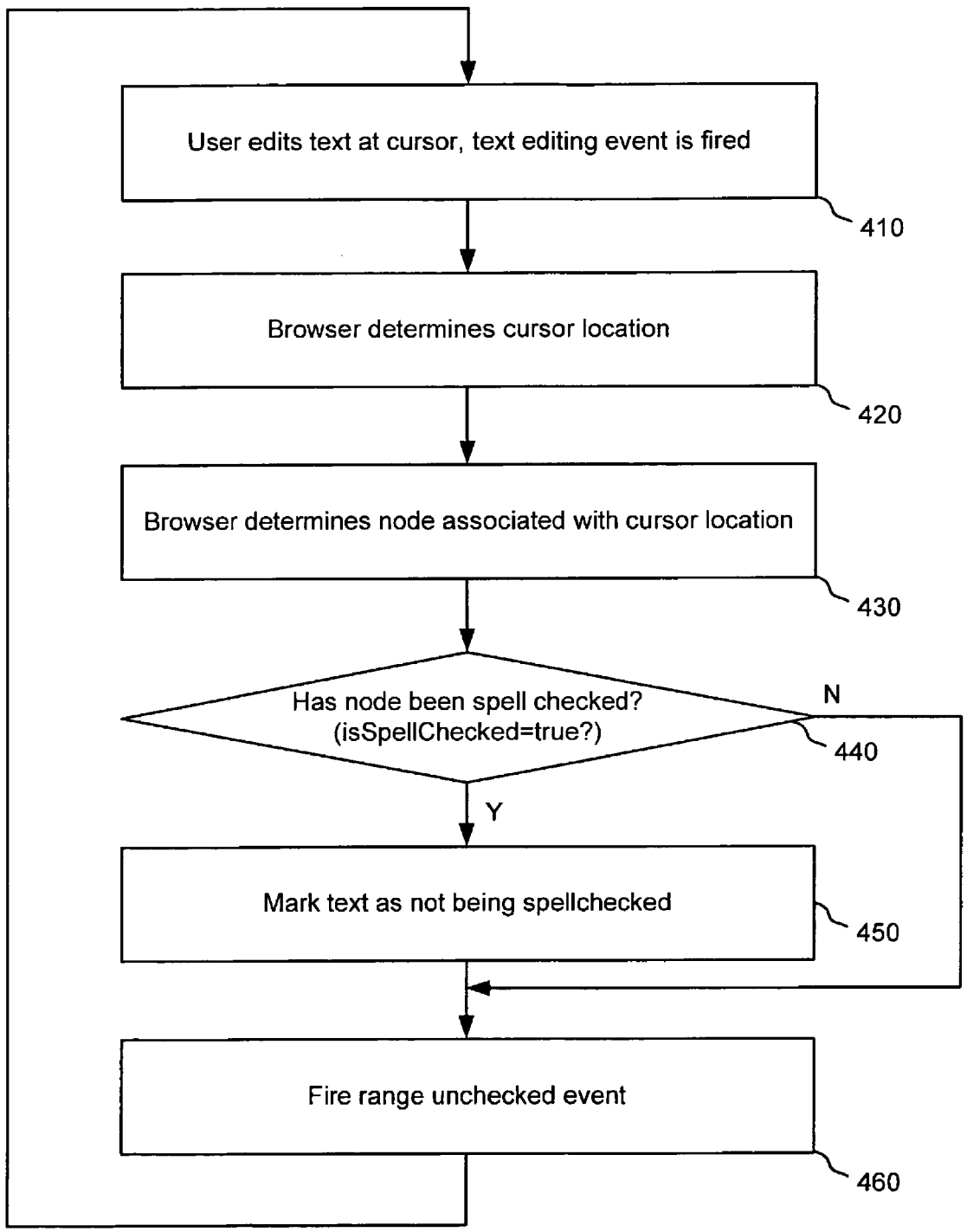
FIG. 4 is a flowchart of an embodiment of a process for identifying text to be spell checked.
Figure 5A:
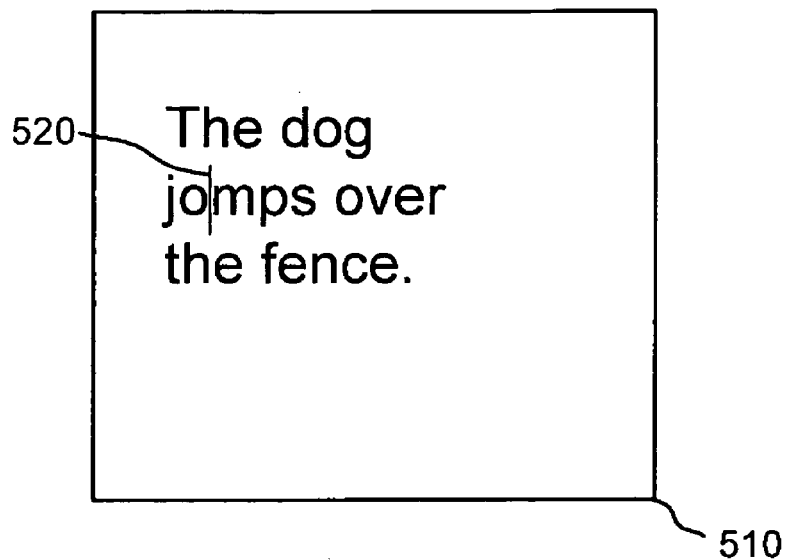
FIG. 5A is an example of text to be spell checked within a network browser-based application.

FIG. 4 illustrates a flowchart of an embodiment of a process for identifying text to be spell checked. In one embodiment, the flowchart of FIG. 4 provides more detail of step 320 of FIG. 3. First, a user edits text at a cursor location and a text editing event is fired. As discussed above, a user may edit text by entering new text, deleting text (for example, deleting part of a word), dragging and dropping text, pasting text, cutting text, or performing some other operation that changes text. In some cases, a user may edit text while generating or replying to or an email. An example of text entered by a user in an interface provided by browser application 165 is provided and discussed below in more detail with respect to FIG. 5A. After determining text has been edited or changed by a user, browser application 165 determines the current cursor location at step 420. The current cursor location should correspond to the location the edits were made. In one embodiment, determining the location of the cursor includes determining the HTML element closest to the cursor. For example, the HTML element may be a particular word closest to or encompassing the cursor. In FIG. 5A below, the word "jomps" is the html element closest to cursor 520 in text block 510.

Next, browser application 165 determines the node associated with the current cursor location at step 430. In one embodiment, a call is made to browser application 165 code determine the node. The call includes the cursor location information determined at step 420. In one embodiment, browser application 165 builds a node tree from a block of text provided to a user. The node tree may include a node for each line of text as well as block tags (DIV tags for text section divisions, P tags for paragraphs, and BR for new lines). For example, text block 510 of FIG. 5A may be built into the node tree of FIG. 5B discussed in more detail below. After the browser determines the node associated with the current cursor location, a determination is made as to whether the node at which the cursor is located has been spell checked at step 440. In one embodiment, each node may be configured with a parameter indicating whether the current node has been spell checked or not. For example, the parameter may be a flag or register titled "IsSpellChecked." In this case, the determination at step 440 will determine if the parameter is present and if it has a value of true. If the parameter is either not present for a particular node or if the parameter is set to false, then the node is determined to not be spell checked and operation continues to step 460. If the node is determined to be spell checked, then operation continues to step 450.

Text associated with the particular node is marked as not being spell checked at step 450. In this case, the node was previously determined to be spell checked. However, since a change has been detected in the text associated with the node, the status of the node is changed. Next, a range unchecked event is fired at step 460. A range unchecked event may be triggered by the text range API implemented by the browser and sent to browser application 165. The event indicates that a portion of the text needs to be spell checked. In one embodiment, browser application 165 may send the changed text to a spell check service in response to each unchecked event fired. In other cases, browser application 165 may wait until a certain number of range unchecked events are fired or until a minimum of time has transpired before sending text to a spell check service. This is discussed in more detail below with respect to FIG. 6. After firing a range unchecked event, operation of the flowchart of FIG. 4 returns to step 410.

FIG. 5A is an example of text to be spell checked. FIG. 5A includes text block 510 and cursor 520. In one embodiment, the text block 510 may be provided in an interface of a content page provided by an email service. The text in text block 510 includes three lines of text. The first line of text is "The dog," the second line of text is "jomps over," and the last line of text is "the fence." Cursor 520 is currently placed between the o and the m in the word "jumps" in the second line of text.

Figure 5B:
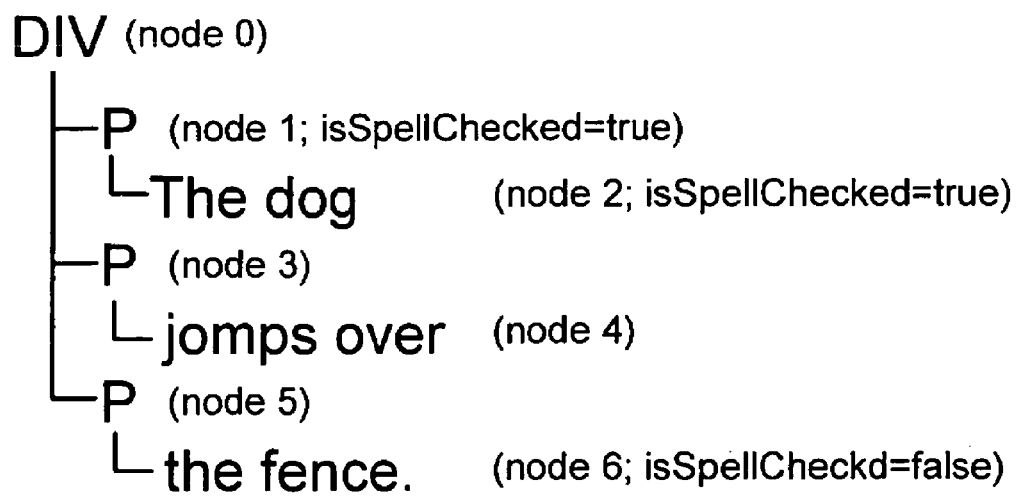
FIG. 5B is an example of a node tree for text to be spell checked.

FIG. 5B is an example of a node tree generated from text entered by a user into an interface. The node tree that a browser builds from interface text is similar to that of an XML tree. In one embodiment, the node tree of FIG. 5B is generated from the text provided in FIG. 5A. The node tree includes a root node of DIV, and three primary nodes of P. Each P node has a child node, or text node. The text content "The dog," "jomps over" and "the fence." are each associated with a particular text node. Each node, including the text nodes, can be associated with one or more node parameters. In the embodiment illustrated, the node parameters may include a node number and an IsSpellChecked parameter. For example, the root node comprising the block tag DIV has a node number of zero and the child node with the text "The dog" has a node number of two and an IsSpellChecked parameter set to true. As discussed above, the IsSpellChecked parameter indicates if the text associated with the particular node has been spellchecked. In one embodiment, if a node is marked as IsSpellChecked=true, all of that node's children nodes are assumed to be spellchecked as well.

Figure 6:
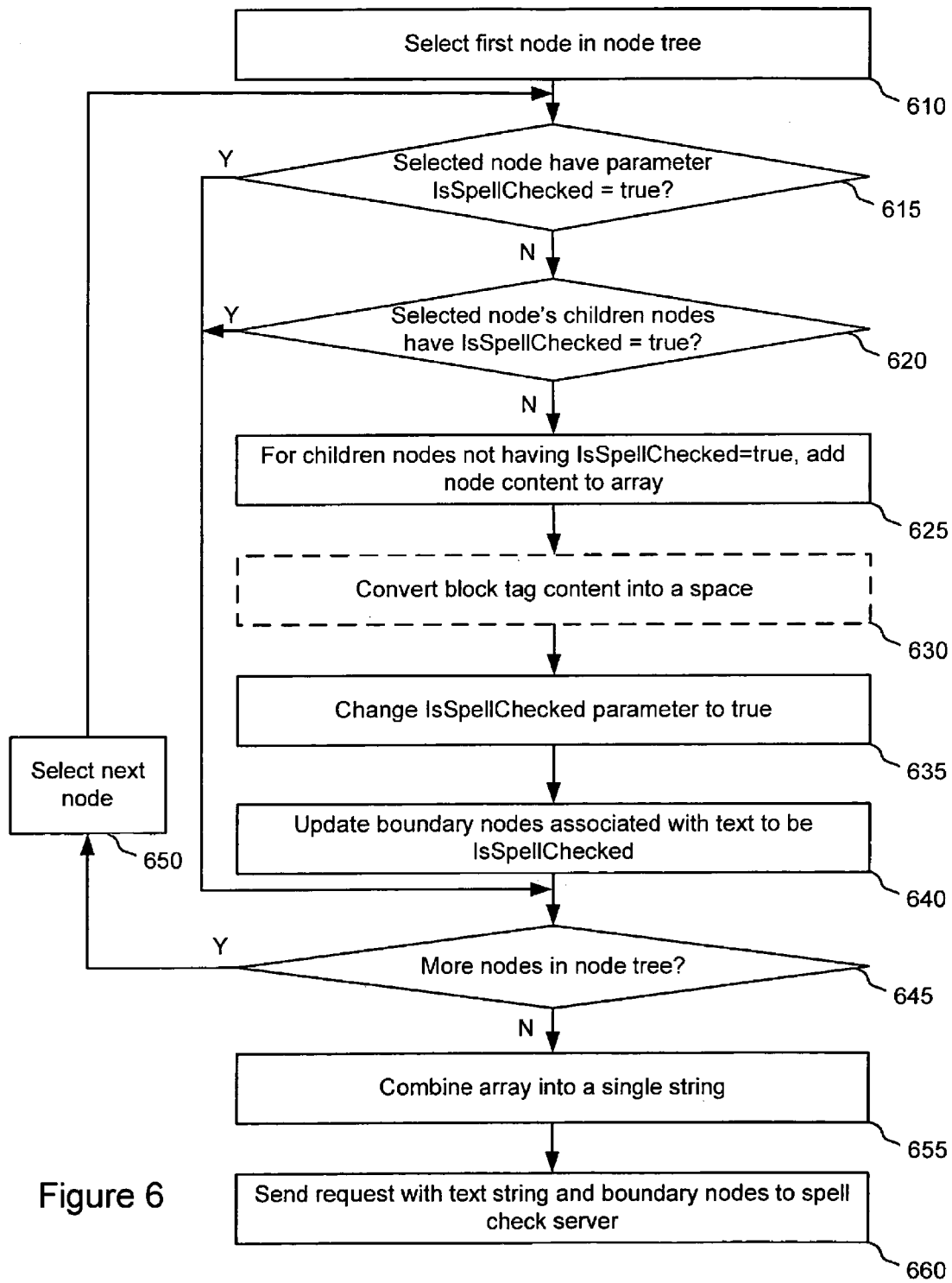
FIG. 6 is a flowchart of an embodiment of a process for sending text to a server to be spellchecked.

FIG. 6 illustrates a flowchart of an embodiment of a process for sending text to a server to be spell checked. In one embodiment, the flowchart of FIG. 6 provides more detail for step 330 of the flowchart of FIG. 3. In general, the text being generated by a user is analyzed to determine portions that have not been spellchecked. The portions not spell-checked are selected and sent to a spell check server. In one embodiment, less than the entire text may be analyzed. For example, a user may be generating a reply to an email. In this case, the content of the user's reply is spell checked but the original email content is not spell checked. This limits the spell checking resources to the user generated text, thereby saving time and resources used to spell check the text.

First, a first node in a node tree is selected at step 610. In the node tree of FIG. 5B, the first node would be the P node with node number equaling one and having a child node of "The dog." Next, a determination is made as to whether the selected node has an IsSpellChecked parameter equal to true at step 615. This determination identifies nodes that should be spell checked. As discussed above, a node may have an IsSpellChecked parameter equal true, false or be missing the IsSpellChecked parameter. If the IsSpellChecked parameter for the selected node is true, then operation continues to step 645. If the parameter is not true or is not available for that node, operation continues to step 620.

Next, a determination is made as to whether the selected node has children nodes which have an IsSpellChecked parameter equal to true at step 620. With respect to FIG. 5B, the child node of the first node selected has a node number of two and includes the text content "The dog." The determination as to whether the child node has an IsSpellChecked parameter with a value of true is the same as that discussed above with respect to step 615. If the selected node has a child node with IsSpellChecked equal to true, operation continues to step 645. If none of the children nodes have IsSpellChecked equal to true, then operation continues to step 625. For each child node not having IsSpellChecked set to true, the node content is added to an array at step 625. The array includes a list of text to be spell checked. Next, block tag content added to the array is converted into a space at step 640. This step is optional as indicated by the dashed lines comprising the box at step 630 in FIG. 6. Block tags may include a P tag, BR tag and a DIV tag. A P tag defines a paragraph, a BR tag inserts a simple line break, and a DIV tag defines a division of a section in a document. These block tags may be used in HTML, XHTML and other documents. The block tags are converted into a space in order to avoid concatenating words inadvertently.

Next, the IsSpellChecked parameter associated with the selected child node is changed to set to true at step 635. This indicates that the particular node is considered to be spell checked. Next, boundary nodes associated with the text to be spell checked are updated at step 640. Boundary nodes mark the range of text covered by the spell check being generated. Thus, the boundary nodes indicate the first and last node of the particular range of text being checked. Configuration of boundary nodes is discussed in more detail below with respect to FIG. 7.

A determination is made as to whether more nodes should be analyzed at step 645. In one embodiment, the additional nodes to be analyzed are additional child nodes for the root node. In some instances, although additional child nodes may exist to be spell checked, other limitations may prevent the additional nodes from being added to the array. For example, the text sent to a server to be spell checked may be limited to a maximum size. In one embodiment, a maximum size of a spell check request may be 2K in memory size. Thus, if additional text in the current node would cause the content of the array to exceed 2 k size, the array may be considered full. In this case, the flow chart would continue to step 655 and selection of nodes for a new array would begin with the current node. If more nodes exist to be analyzed, operation continues to step 650 wherein the next node is selected.

After selecting the next node, the flowchart of FIG. 6 returns to step 615. If no further nodes exist to be analyzed, operation continues to step 655. In one embodiment, although more nodes may exist in the node tree, analyzing the nodes may end before all the nodes have been checked. This may be the case if a maximum amount of content has already been selected to be spell checked. In this instance, operation would proceed to step 655.

The generated array is combined into a single string of text at step 655. The single string of text can later be processed by a spell checking service. In one embodiment, elements within the array are separated with a space to avoid processing multiple words as a single word. After combining the array into a single string, the string and the boundary node information are submitted to a spell check server at step 660. In one embodiment, the string and boundary nodes are packaged in a request. In some embodiments, the boundary nodes are optional and need not be packaged in the request. In this case, they are maintained at the client device in client memory. In this case, the application would pair the boundary information to the set of words to be spell checked. The request is then sent to network server 140. Network server 140 receives the request and forwards the request to any of spell check servers 110-130.

In one embodiment, a document identifier may be packaged in the request in addition to the string and boundary node information. The document identifier identifies a current page or document for which the boundary nodes and text string apply. The document identifier can then be returned in a content response identifying the page. Browser application 165 may use the document identifier to ensure that any corrections or processing of text was applied to the correct document. Processing of a text string and boundary nodes by a spell check service is discussed in more detail with respect to FIG. 8.

Figure 7:
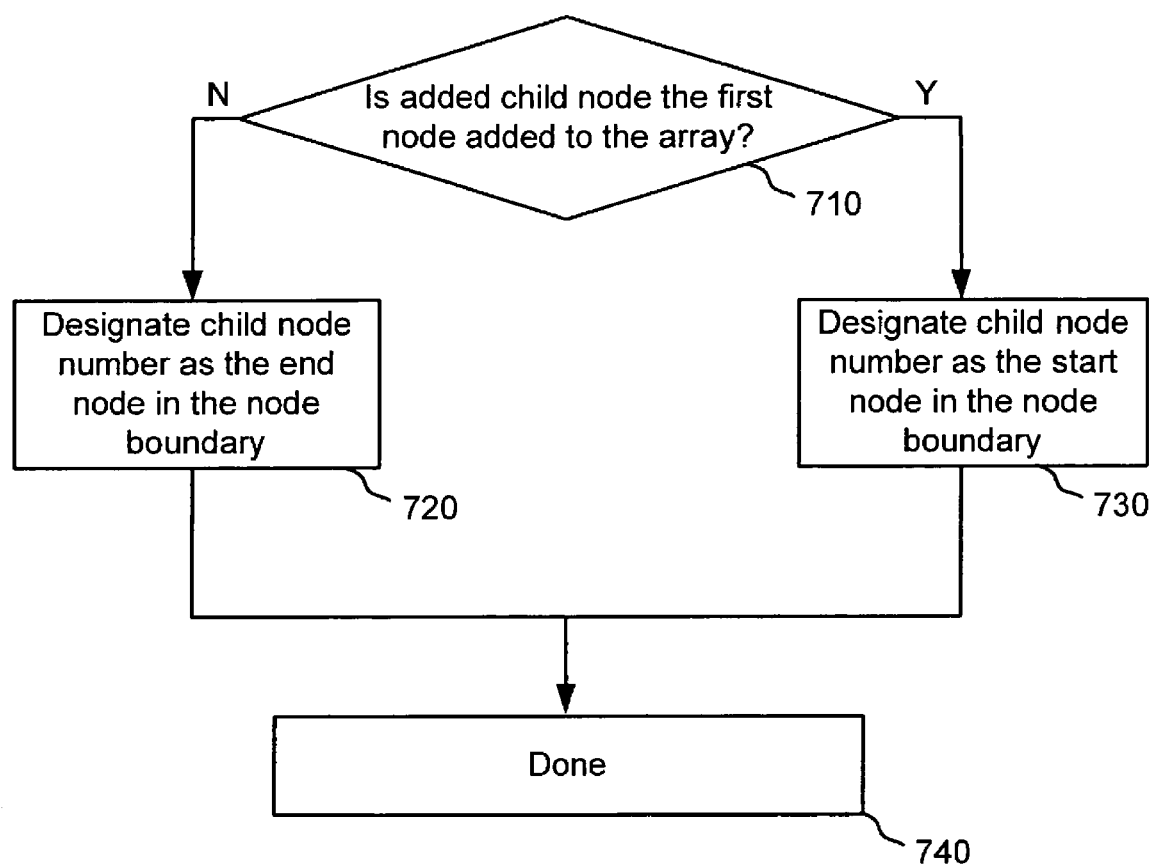
FIG. 7 is a flowchart of an embodiment of a process for configuring boundary nodes for a range of text.

FIG. 7 illustrates a flowchart of an embodiment of a process for configuring boundary nodes for a range of text. FIG. 7 provides more detail for step 640 of FIG. 6. In one embodiment, the boundary nodes comprise the first and last nodes of the text added to the array and being spell checked. First, the determination is made as to whether the newly added child node is the first node added to the array at step 710. If a newly added child node is the first node added to the array, operation of the flowchart of FIG. 7 continues to step 730. If the added child node is not a first node added to the array, the flowchart continues to step 720.

The first child node to be added to the array is designated as the start node of the boundary nodes at step 730. Assuming that nodes are analyzed in sequential order, the first node added to the array will be the first node of the text range designated for spell checking. The flowchart of FIG. 7 then ends at step 740. At step 720, since the added node is not the first node in the array, the child node is designated as the end node of the boundary nodes. The flowchart of FIG. 7 then ends at step 740.

Figure 8:
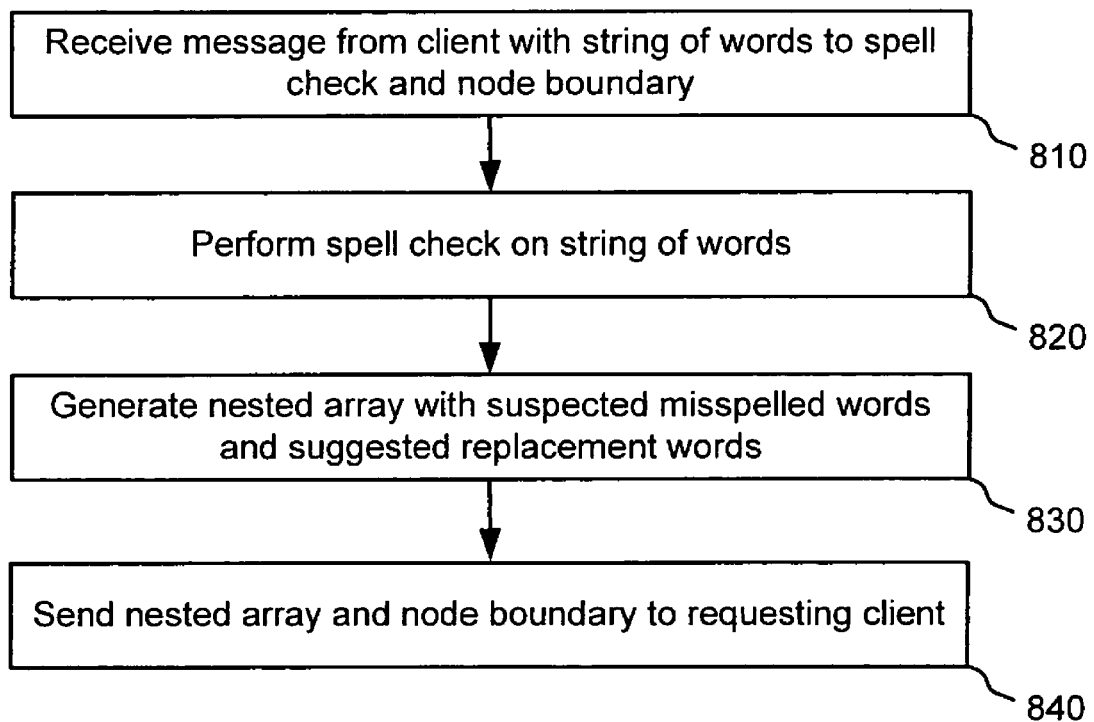
FIG. 8 is a flowchart of an embodiment of a process for spell checking a set of words by a server.

FIG. 8 illustrates a flowchart of an embodiment of a process for spell checking a set of words by a server. In one embodiment, FIG. 8 provides more detail for step 340 of FIG. 3. Spell checking can be done in different ways by any number of different spell check services. Typically, a spell check service receives words from a remote client device. The service then compares the received words to a number of words in a library and determines if any of the received words are misspelled. In one embodiment, the service can provide suggested replacement words as well as an indication of the suspected misspelled words themselves. The flowchart of FIG. 8 provides a high level example of one process for performing a spell check service.

The flowchart of FIG. 8 begins with receiving a message from a client at step 810. The message includes a string of words to spell check and boundary node information. Optionally, the message may also include a document identifier. The message is the same message sent at step 660 of FIG. 6 discussed above. Next, a spell check is performed on the received string of words at step 820. Typically, the spell check includes comparing each word in the string to a library of known words. A nested array is then generated with the suspected misspelled words and suggested replacement words at step 830. For example, the nested array may begin with a list of misspelled words and have further entries comprised of the suggested replacement words. The nested array and node boundary information are transmitted to the requesting client device at step 840. In one embodiment, a content response including a nested array and node boundary information may also include a document identifier received with the initial request at step 810.

Figure 9:
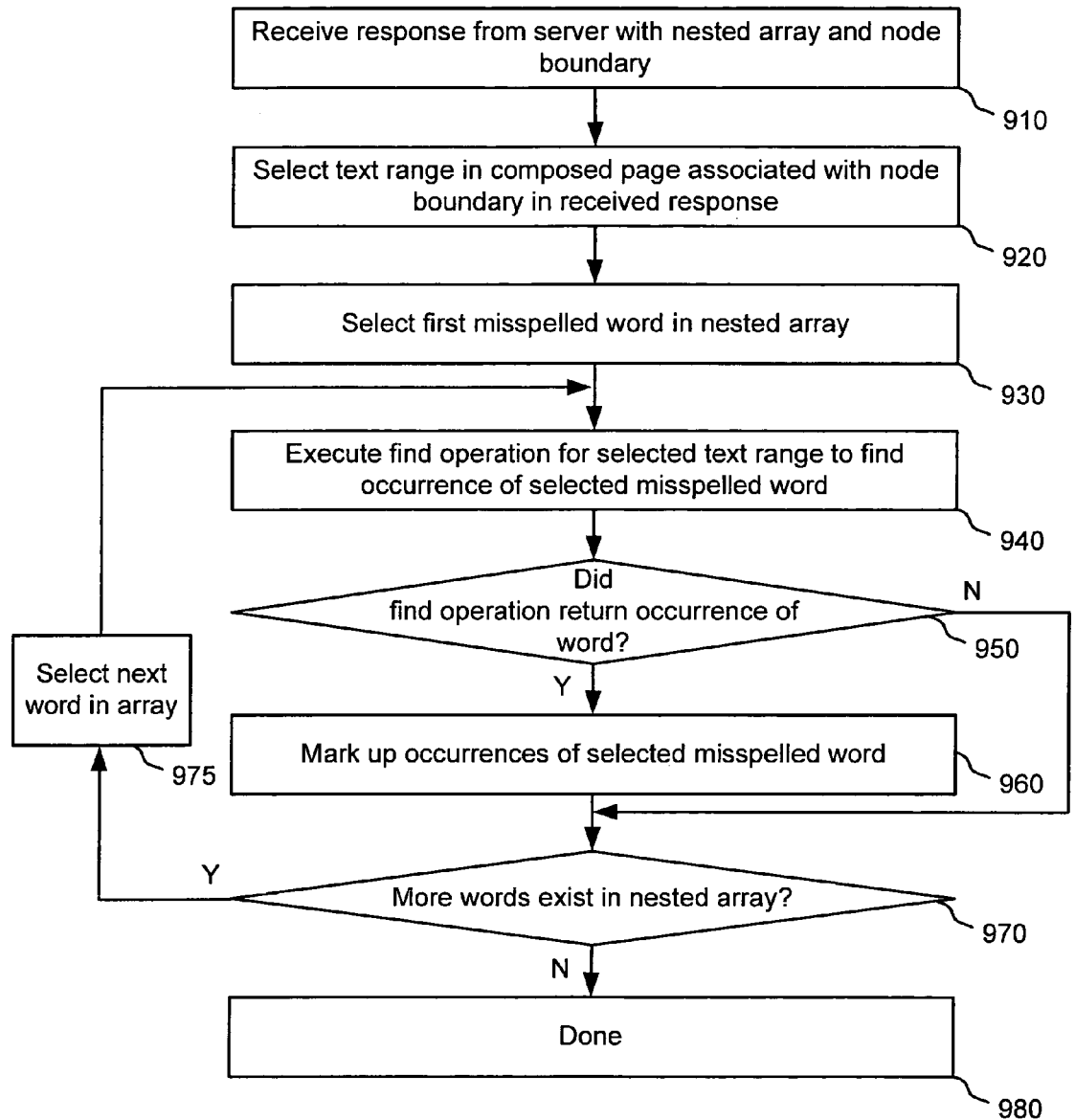
FIG. 9 is a flowchart of an embodiment of a process for processing a text range with correction information.

FIG. 9 is a flowchart of an embodiment of a process for processing a text range within a content page with correction information. The flowchart of FIG. 9 provides more detail for step 360 of FIG. 3. First, a response is received from network server 140. The response is associated with the request sent by client 160 at step 660 of FIG. 6. The response includes the nested array and boundary nodes as correction information. The correction information may also include a document identifier associated with the correction information. The correction information can be used to identify and process misspelled words in a document.

A text range associated with the boundary nodes is selected at step 920. In this case, the start and end node are retrieved from the response received from network server 140. The text residing in and between the start and end nodes comprise a text range for which the spell checking service was performed.

In one embodiment, before selecting the text range corresponding to the boundary nodes, the document identifier received in the response is compared to a document identifier in the current content page. If the document identifiers match, then the flowchart of FIG. 9 continues to step 920. If they do not match, then the flowchart of FIG. 9 ends at step 980.

Once the text range is selected, the first misspelled word in the nested array is selected at step 930. A find operation is performed on the selected text range to find any occurrences of the selected misspelled word at step 940. In one embodiment, the text range API implemented by browser application 165 may include a method called Find Text. The Find Text method may search a text range for a particular word. In this case, the Find Text method may be used to search for a selected word in the nested array. Next, a determination is made as to whether the find operation returned an occurrence of the selected word at step 950. If the find operation did not return any occurrences of the misspelled word, operation continues to step 970.

If the operation did return an occurrence of the selected word, the occurrences of the selected misspelled word are marked up at step 960. Marking up the misspelled word occurrences may begin with selecting a text range that includes the misspelled word in the page. In this case, the text range may begin just before the word and end immediately after the word. After the text range is set about the word, a null formatting may be applied to the new text range. The null formatting may include formatting which does not affect display of the word. For example, null formatting may include setting a transparent background for the word. When applying formatting to the word, browser application 165 can define the HTML element associated with the text range to have its own node. Thus, after a node is formatted for the range, a style may be applied to the new node. The style may indicate in some manner that the word has been identified as being misspelled. For example, red underlining may be applied to the selected word or text range. The style may be applied as part of a cascaded style sheet (CSS) by the API implemented by browser application 165.

After marking up the occurrence of the selected misspelled word, a determination is made as to whether more words exist in the nested array at step 970. If more words exist to be processed within the nested array, the next word in the array is selected at step 975 and the flowchart returns to step 940. If no further words exist in the nested array to be processed, the flowchart of FIG. 9 ends at step 980.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for processing text in a network browser, comprising:

displaying text in a content page provided via a network browser, wherein the text includes text which is entered into the content page by a first user through a client device executing the network browser and text generated by a second user; and automatically limiting spell checking to the text which is entered by the first user by associating sections of the text entered by the first user with a plurality of respective nodes, detecting a change by the first user in one or more portions of the text after the text has initially been displayed in the content page, identifying one or more of the nodes that are associated with the changed text portions, transmitting one or more of the nodes that are associated with the changed text portions to a spell check service in response to detecting the change; and receiving correction information for the changed text portion from the spell check service in response to the transmitting step, wherein the correction information is displayed on the client device.

2. The method of claim 1, wherein said step of detecting a change includes:

receiving user input that changes the text.

3. The method of claim 1, wherein said step of transmitting the changed text includes:

determining boundary information associated with the changed text portion, wherein the boundary information is electronic data representing a start node and an end node that encompasses the range of the text included in the changed text portion; and adding the boundary information to the spell check request.

4. The method of claim 1, wherein said step of transmitting includes:

setting a parameter to indicate the changed text has been spell checked.

5. The method of claim 1, wherein said step of transmitting includes:

transmitting identification information for the content page associated with the changed text.

6. One or more processor readable storage devices having processor readable code embodied on said processor readable storage devices, said processor readable code for programming one or more processors to perform a method comprising:

displaying text including text which has been entered by a first user and original email content generated by a second user in a content page provided by a browser;

identifying the original email content as text not available for spell checking;

associating sections of the displayed text which have been entered by the first user with a plurality of respective nodes;

determining that one or more portions of the displayed text are being edited by the first user, wherein the portions of the displayed text being edited have previously been processed for spelling errors;

identifying one or more of the nodes that are associated with the text portions being edited;

transmitting the one or more nodes that are associated with the text portions being edited to a spell check service, wherein the spell check service generates correction information associated with the text portions being edited;

displaying the correction information generated by the spell check service; and processing the text portions being edited with the correction information generated by the spell check service.

7. The one or more processor readable storage devices of claim 6, wherein said step of determining includes identifying boundary information associated with the text.

8. The one or more processor readable storage devices of claim 7, wherein said step of transmitting includes:
   adding the edited text and boundary information to an array including a list of text to be spell checked;
   packaging the array into a request;
   transmitting the request to the server.

9. The one or more processor readable storage devices of claim 6, wherein said step of processing includes:
   selecting a portion of the text in the content page that corresponds to the correction information.

10. The one or more processor readable storage devices of claim 9, wherein said step of selecting includes:
    selecting a portion of the text corresponding to a set of boundary nodes.

11. The one or more processor readable storage devices of claim 6, wherein said step of processing includes:
    detecting text that matches an identified misspelled word in the correction information.

12. The one or more processor readable storage devices of claim 6, wherein said step of processing includes:
    applying formatting to text which corresponds to the correction information.

13. A method for retrieving spell check information for text in a browser application, comprising:
    receiving user input indicating that changes have been made to text previously displayed in a browser application interface, wherein the previously displayed text includes text entered by the user which has been spell checked and associated with one or more nodes and text entered by another user not available for spell checking;
    determining at least one node associated with the changed text;
    if a node associated with the changed text has previously been spell checked, marking the node associated with the changed text as not spell checked;
    adding the changed text associated with a node marked as not spell checked to an array, wherein the array includes a list of text to be spell checked;
    packaging the array into a request;
    transmitting the request to a server; and
    receiving spell check information from the server in response to the request.

14. The method of claim 13, wherein said step of receiving user input includes:
    firing a text editing event in response to detecting user edits to text in the browser application interface.

15. The method of claim 13, wherein said step of transmitting includes:
    configuring a parameter associated with the changed text to indicate the changed text has been spell checked.

16. The method of claim 13, wherein said step of receiving spell check information includes:
    receiving a nested array of correction information, the correction information including a list of misspelled words and suggested correct spellings for each misspelled word.

17. The method of claim 13, wherein the step of determining the node associated with the changed text includes:
    determining a current cursor location corresponding to the location the changes to the text were made; and
    determining the node associated with the current cursor location.

18. The method of claim 13, wherein the correction information includes suspected misspelled words in the request and suggested replacement words.

* * * * *

UNITED STATES PATENT AND TRADEMARK OFFICE
CERTIFICATE OF CORRECTION

PATENT NO.        : 8,006,180 B2                                    Page 1 of 1
APPLICATION NO.   : 11/328781
DATED             : August 23, 2011
INVENTOR(S)       : Brian R. Tunning et al.

It is certified that error appears in the above-identified patent and that said Letters Patent is hereby corrected as shown below:

Title page, in field (73), under "Assignee" column 1, line 1, delete "Mircrosoft" and insert
    -- Microsoft --, therefor.

Signed and Sealed this
Twenty-fifth Day of October, 2011

David J. Kappos
*Director of the United States Patent and Trademark Office*